United States Patent [19]

Soirinsuo et al.

[11] Patent Number: 6,084,855
[45] Date of Patent: Jul. 4, 2000

[54] METHOD AND APPARATUS FOR PROVIDING FAIR TRAFFIC SCHEDULING AMONG AGGREGATED INTERNET PROTOCOL FLOWS

[75] Inventors: Timo Soirinsuo, Cambridge, Mass.; Outi Markki, Espoo, Finland

[73] Assignee: Nokia Telecommunications, OY, Espoo, Finland

[21] Appl. No.: 08/802,451

[22] Filed: Feb. 18, 1997

[51] Int. Cl.[7] .................................. H04J 1/16; H04J 3/14
[52] U.S. Cl. .............................................. 370/235
[58] Field of Search ................... 370/229–235, 370/252, 253, 390, 389, 391, 392, 351–356

[56] References Cited

U.S. PATENT DOCUMENTS

| | | | |
|---|---|---|---|
| 5,278,830 | 1/1994 | Kudo | 370/412 |
| 5,499,238 | 3/1996 | Shon . | |
| 5,717,858 | 2/1998 | Shtayer et al. | 395/200.11 |
| 5,828,653 | 10/1998 | Goss . | |
| 5,872,771 | 2/1999 | Park et al. | 370/252 |

FOREIGN PATENT DOCUMENTS

| | | |
|---|---|---|
| 0 763 915 A2 | 3/1997 | European Pat. Off. . |
| WO 97/13346 | 4/1997 | WIPO . |
| WO 98/26510 | 6/1998 | WIPO . |

OTHER PUBLICATIONS

P. Newman et al., "Flow Labelled IP: A Connectionlness Approach to ATM", Proc. IEEE Infocom, Mar. 1996, Ch. 5–6, pp. 1255–1260.

*Primary Examiner*—Ajit Patel
*Attorney, Agent, or Firm*—Altera Law Group, LLC

[57] ABSTRACT

A method and apparatus is disclosed for providing fair traffic scheduling of L2 connections based on the number of IP flows and a priority coefficient for flow groups in the L2 connection. IP flows are scheduled according to a priority coefficient. The system identifies a number of IP flows for a plurality of connections, assigns a priority coefficient for each of the IP flows and schedules the IP flows according to the priority coefficient. The assignment of a priority coefficient results in a probability $P_i$ that a data unit belonging to a flow carried over connection $A_i$ will be selected for forwarding as defined by $\sigma_i * x_i / \Sigma(x_1 \ldots x_n)$, $i=\{1,2,\ldots n\}$, where $x_i$ is the number of flows carried over connection $A_i$, $\sigma_i$ is the priority and n is the number of connections. The relationship between the number of flows $x_i$ and the priority $\sigma_i$ is defined by $\Sigma_{(e=1-n)}(\sigma_i * x_i)/\Sigma_{(i=1-n)} x_i = 1$.

32 Claims, 6 Drawing Sheets

METHOD AND APPARATUS FOR PROVIDING FAIR TRAFFIC SCHEDULING AMONG AGGREGATED INTERNET PROTOCOL FLOWS

BACKGROUND OF THE INVENTION

1. Field of the Invention

This invention relates in general to a method and apparatus for controlling Internet Protocol flows, and more particularly to a method and apparatus for providing fair traffic scheduling among aggregated IP flows.

2. Description of Related Art

Today, an organization's computer network has become its circulatory system. Organizations have combined desktop work stations, servers, and hosts into Local Area Network (LAN) communities. These Local Area Networks have been connected to other Local Area Networks and to Wide Area Networks (WANs). It has become a necessity of day-to-day operation that pairs of systems must be able to communicate when they need to, without regard to where they may be located in the network.

During the early years of network computing, proprietary networking protocols were the standard. However, the development of the Open Systems Interconnection Reference Model introduced by the International Organization for Standardization (ISO) has led to an impressive degree of interworking, which generally allows end-user applications to work very well between systems in a network. Implementations are based on written standards that have been made available by volunteers from dozens of computer vendors, hardware component vendors and independent software companies.

During the last decade, LANs have been proliferating. This has created a recurring problem of how to minimize congestion and optimize throughput that must be solved by network managers. An early solution was to simply divide Local Area Networks into multiple smaller networks serving smaller populations. These segments were connected by bridges to form a single Local Area Network with traffic being segregated locally to each segment.

The evolution of new network types and Wide Area Networks created a need for routers. Routers added filtering and firewalling capability to provide more control over broadcast domains, limit broadcast traffic and enhance security. A router is able to chose the best path through the network due to embedded intelligence. This added intelligence also allowed routers to build redundant paths to destinations when possible. Nevertheless, the added complexity of best path selection capability accorded by the embedded intelligence increased the port cost of routers and caused substantial latency overhead. Shared-media networks comprising distributed client/server data traffic, expanded user populations and more complex applications gave birth to new bandwidth bottlenecks. Such congestion produced unpredictable network response times, the inability to support the delay-sensitive applications and higher network failure rates.

Networks and protocols in use today have been designed to operate using connection-less transmission technology based on global addressing. The most popular protocol of this type is the Internet Protocol (IP).

An internet is a set of networks connected by gateways, which are sometimes referred to as routers. The Internet Protocol is a network layer protocol that routes data across an internet. The Internet Protocol was designed to accommodate the use of host and routers built by different vendors, encompass a growing variety of growing network types, enable the network to grow without interrupting servers, and support higher-layer of session and message-oriented services. The IP network layer allows integration of Local Area Network "islands". Still, graphics and multimedia content are putting ore demand on the performance of such networks. As the umber of users increases network traffic, bandwidth becomes increasingly problematic. While the Internet continues to grow, so does the intranet as more and more private enterprise networks are being based on the Internet Protocol.

IP traffic is carried over various data link layers (L2) and transmission media. IP consists of flows, which are sequences of interrelated packets that are sent from a source to a destination(s). Multiple IP flows can be conveyed over a single data link.

In cases where logical data link layer connections can be used, two possibilities exist for carrying IP flows over data link layer connections. A data link layer (L2) connection can either be dedicated for a single IP flow or, alternatively, several flows can be multiplexed into one connection. If these different types of L2 connections have the same L2 traffic class, the connections are competing for the same network resources. If both of these methods of utilizing L2 connections are used in the network at the same time and, as is generally the case, fairness between users of the IP network (i.e., fairness among aggregated IP flows in an IP network) has to be guaranteed. In general, the IP flows which have the identical level of IP Quality of Service should get equal treatment in the network. However, a simple scheduling algorithm where one L2 data unit is taken from each queue, as currently implemented in the art, in turns favors connections that carry only one or few IP flows. Therefore, more sophisticated approaches have been tried.

For example, an approach of measuring carried traffic over a particular connection in terms of bytes or frames transferred over an L2 connection is straightforward. However, fair scheduling cannot be based solely on traffic volume. Otherwise, bandwidth intensive flows would disproportionately dominate the traffic flow at the cost of the other flows. To provide fairness at the IP level, information is needed about the number of flows using each connection. Unfortunately, traffic monitoring cannot be done at the data link layer as interpretation of the traffic is based on the information carried in the higher level protocol data units. Nevertheless, there are three basic methods that can used for obtaining the necessary information on flows.

The first method, Out-of-Band notification, uses a separate IP level protocol to inform network elements along the path of an L2 connection on the approximate number of users. This information is more naturally generated by the edge devices. Out-of-Band notification can also be given to a network element via a network management system through an operator's initiative, which is further distributed among network elements by the separate IP level protocol. However, a solution where network management configures these values to each network element is not scaleable to large networks.

The second method is packet snooping. Packet snooping involves intermediate network elements periodically analyzing the traffic flow to get an idea about how many flows utilize each L2 connection.

The third method is an implicit method, e.g., different logical identifier ranges are used for different aggregation levels. When setting up an L2 connection, e.g., tag switching or other IP switching methods like Ipsilon flow management schemes, the flow granularity is taken into account when deciding the service level. If the L2 connection identifier is associated with an IP network address, then it is likely that more flows will use that L2 connection. Also, the address can provide an indication of the size of the target network. With IPv4 network classification, for example, this implementation is straightforward.

Still, using a separate IP level protocol requires standardization and implicit methods, although seemingly straightforward, requires careful configuration between adjacent network elements. However, packet snooping can be implemented individually by each network element.

It can be seen then that there is a need for a method and apparatus that provides for fair traffic scheduling. It can also be seen that there is a need for a fair traffic scheduling method and apparatus that can be implemented by each network element.

SUMMARY OF THE INVENTION

To overcome the limitations in the prior art described above, and to overcome other limitations that will become apparent upon reading and understanding the present specification, the present invention is directed to a method and apparatus that provides for fair traffic scheduling.

The present invention solves the above-described problems by providing a method and apparatus for scheduling the IP flows according to a priority coefficient, rather than according to traffic volume solely.

The system in accordance with the principles of the present invention identifies a number of IP flows for a plurality of connections, assigns a priority coefficient for the plurality of connections and schedules the IP flows according to the priority coefficient.

Other embodiments of a system in accordance with the principles of the invention may include alternative or additional aspects. One such aspect of the present invention concerns the assignment of a priority coefficient resulting in a probability ($P_i$) that a data unit belonging to a flow carried over connection $A_i$ of n total connections, $A_i \ldots A_n$, is selected for forwarding as defined by:

$$p_i = \frac{\sigma_i * x_i}{\sum (x_1 \ldots x_n)} \{i = 1, 2, \ldots n\}$$

where $x_i$ is the number of flows carried over connection $A_i$, $\sigma_i$ is the priority coefficient and n is the total number of connections.

Another aspect of the present invention concerns a relationship between the number of flows $x_i$ and the priority coefficient $\sigma_i$, which may be described by the following equation:

$$\frac{\sum_{(i=1-n)} (\sigma_i * x_i)}{\sum_{(i=1-n)} x_i} = 1.$$

Another aspect of the present invention concerns the step of identifying the number of IP flows, which further comprises the steps of monitoring packets carried over an L2 connection, extracting address information from the packets for a predetermined sample period, storing the extracted address information, counting the number of extractions stored and estimating the number of IP flows based upon the number of stored extractions counted.

Another aspect of the present invention involves the step of extracting address information, which comprises the step of extracting full source address:port and destination address:port from the packets.

Yet another aspect of the present invention concerns the step of extracting address information, which comprises the step of extracting only a host or port part of an IP address from the packets.

Another aspect of the present invention concerns the step of storing the address information, which further comprises the step of compressing the extracted address information.

Another aspect of the present invention concerns the step of monitoring packets, which comprises the steps of replicating PDUs and directing the replicated PDUs to a processor for address extraction.

Another aspect of the present invention concerns the processor, which is outside the data path.

Another aspect of the present invention concerns the step of monitoring packets, which comprises the step of sampling the packets along the data path.

Another aspect of the present invention concerns the predetermined sample period, which comprises a selected time duration.

Still another aspect of the present invention concerns the predetermined sample period, which comprises the time required to sample a predetermined number of packets.

Another aspect of the present invention involves the step of assigning a priority coefficient, which further comprises the step of gaining a higher priority coefficient to a connection having more users.

Another aspect of the present invention concerns the step of assigning a coefficient factor, which further comprises the step of differentiating a flow based on a management parameter.

Another aspect of the present invention concerns the management parameter, which comprises operational and administrative considerations.

Another aspect of the present invention concerns the step of assigning a priority coefficient, which is based upon a compensation structure for different flow types.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for scheduling the IP flows according to a priority coefficient. According to the invention, the scheduling of IP flows are prioritized by identifying a number of IP flows for a plurality of connections, assigning a priority to each of the connections based on the identified number of IP flows and scheduling the forwarding of packets in the IP flows according to the assigned priority. The priority coefficient can be used to differentiate a flow based on a management parameter such as operational and administrative considerations. Further, the priority coefficient can be based upon a compensation structure for different flow types.

Thus, the IP flows may be prioritized, rather than simply taking an L2 data unit from each queue in accordance with a prior art approach. The routing and relaying of data through the network occurs in the network layer of the seven layer Open Systems Interconnection (OSI) model. The network layer will now be described with reference to the seven layer OSI model.

Figure 1:
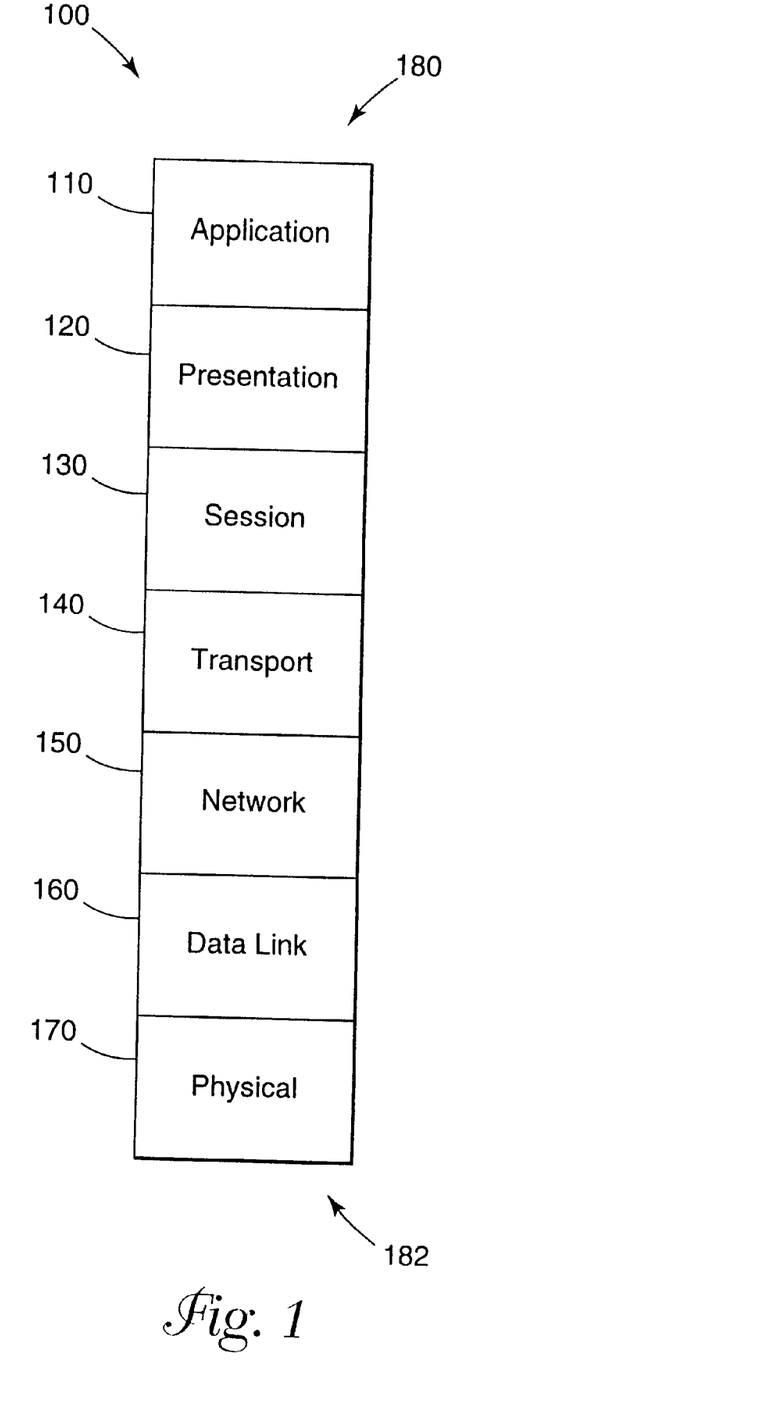
FIG. 1 illustrates the Open Systems Interconnection (OSI) model.

FIG. 1 illustrates the Open Systems Interconnection (OSI) model 100 which includes seven layers, including an application 110, presentation 120, session 130, transport 140, network 150, link 160, and physical layer 170. The OSI model 100 was developed by the International Organization for Standardization (ISO) and is described in "The Basics Book of OSI and Network Management" by Motorola Codex from Addison-Wesley Publishing Company, Inc., 1993 (First Printing September 1992), and which is incorporated by reference herein.

Each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multi-layer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top 180 to bottom 182 in one open system (Open System A, the source), across the communications line, and then from bottom 182 to top 180 in the other open system (Open System B, the destination). Each time that user application data passes downward from one layer to the next layer in the same system, more processing information is added. When that information is removed and processed by the peer layer in the other system, it causes various tasks (error correction, flow control, etc.) to be performed.

The ISO model has specifically defined all seven layers, which are summarized below in the order in which the data actually flows as they leave the source:

Layer 7, the application layer 110, provides for a user application (such as getting money from an automatic bank teller machine) to interface with the OSI application layer. The OSI application layer 110 has a corresponding peer layer in the other open system, the bank's host computer.

Layer 6, the presentation layer 120, makes sure the user information (a request for $50 in cash to be debited from your checking account) is in a format (i.e., syntax or sequence of ones and zeros) the destination open system can understand. Layer 5, the session layer 130, provides synchronization control of data between the open systems (i.e., makes sure the bit configurations that pass through layer 5 at the source are the same as those that pass through layer 5 at the destination).

Layer 4, the transport layer 140, ensures that an end-to-end connection has been established between the two open systems and is often reliable (i.e., layer 4 at the destination confirms the request for a connection, so to speak, that it has received from layer 4 at the source).

Layer 3, the network layer 150, provides routing and relaying of data through the network (among other things, at layer 3 on the outbound side, an address gets placed on the envelope which is then read by layer 3 at the destination).

Layer 2, the data link layer 160, includes flow control of data as messages pass down through this layer in one open system and up through the peer layer in the other open system.

Layer 1, the physical interface layer 170, includes the ways in which data communications equipment is connected mechanically and electrically, and the means by which the data moves across those physical connections from layer 1 at the source to layer 1 at the destination.

Figure 2:
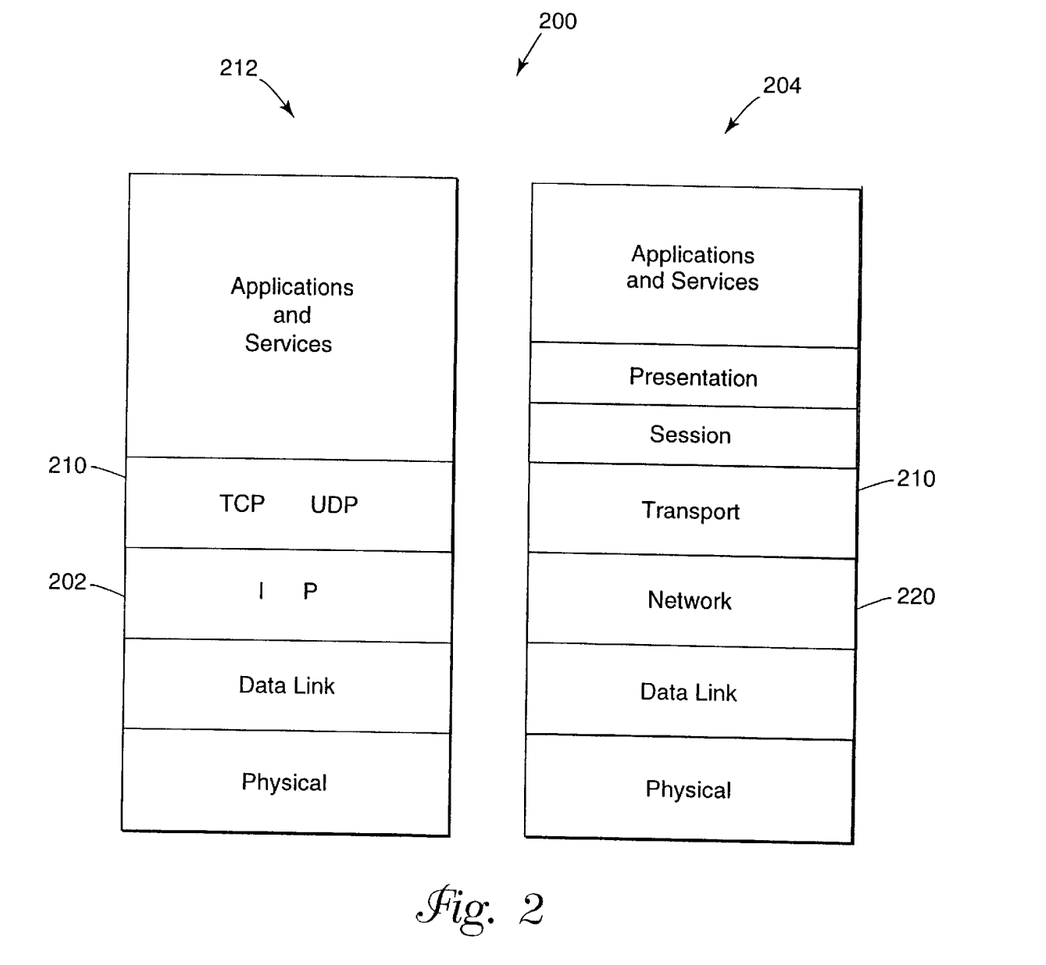
FIG. 2 is a comparison illustrating where the IP network layer fits in the OSI seven layer model.

FIG. 2 is a comparison 200 illustrating where the IP network layer 202 fits in the OSI seven layer model 204. In FIG. 2, the transport layer 210 provides data connection services to applications and may contain mechanisms that guarantee that data is delivered error-free, without omissions and in sequence. The transport layer 210 in the TCP/IP model 212 sends segments by passing them to the IP layer 202, which routes them to the destination. The transport layer 210 accepts incoming segments from IP 202, determines which application is the recipient, and passes the data to that application in the order in which it was sent.

Thus, the IP 202 performs network layer functions and routes data between systems. Data may traverse a single link or may be relayed across several links in an internet. Data is carried in units called datagrams, which include an IP header that contains layer 3 220 addressing information. Routers examine the destination address in the IP header in order to direct datagrams to their destinations. The IP layer 202 is called connectionless because every datagram is routed independently and the IP layer 202 does not guarantee reliable or in-sequence delivery of datagrams. The IP layer 202 routes its traffic without caring which application-to-application interaction a particular datagram belongs to.

Figure 3:
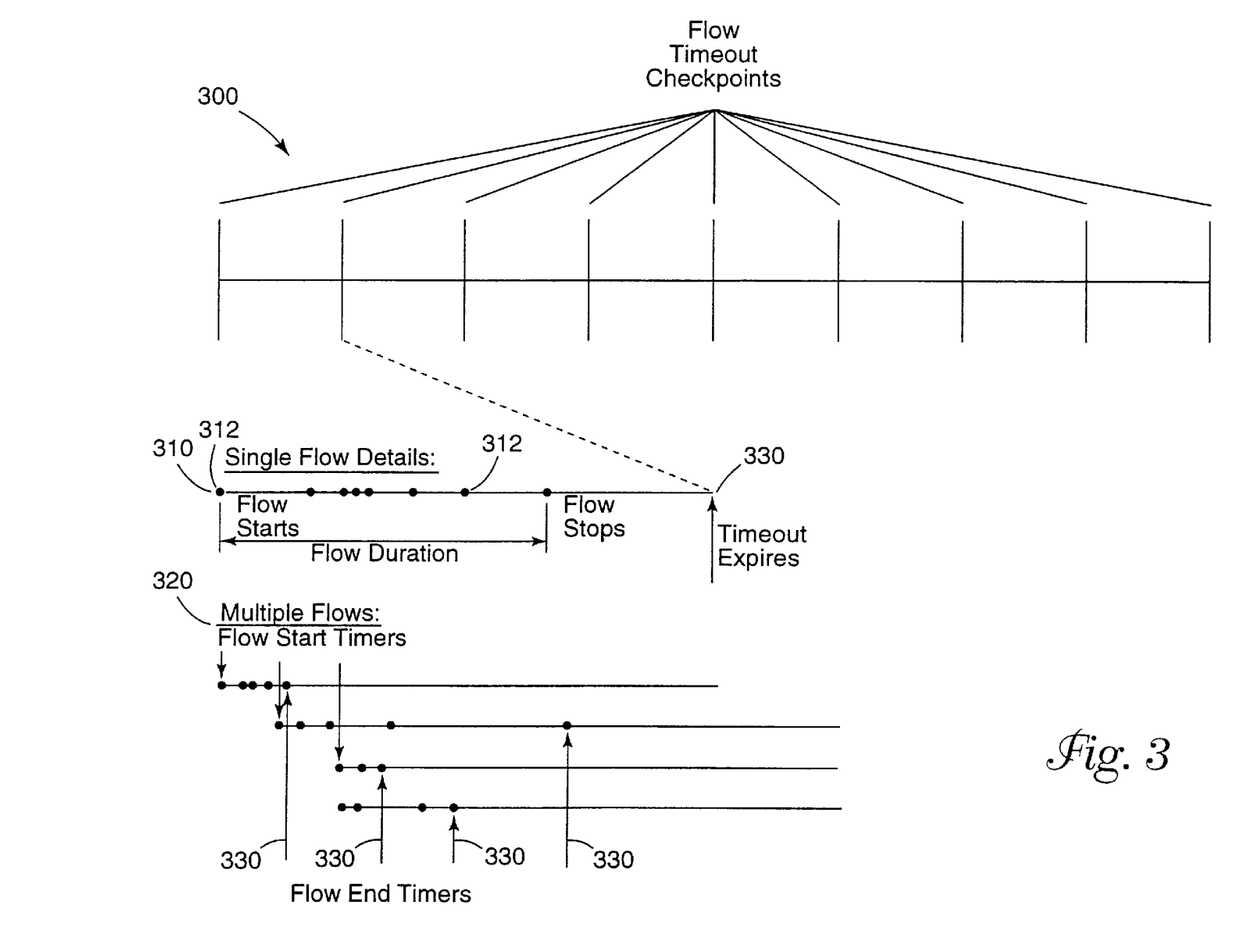
FIG. 3 illustrates a model of a flow based on traffic activity from endpoints as perceived at a given network measurement point.

FIG. 3 illustrates a model 300 of a flow based on traffic activity from endpoints as perceived at a given network measurement point. An IP flow 310 is a sequence of packets 312 sent from a particular source to a particular (unicast or multicast) destination that are related in terms of their routing and any local handling policy they may require. Flows in a connectionless network perform a function similar to the role the connection plays in a connection oriented network. The nature of that special handling might be conveyed to the routers by a control protocol, such as a resource reservation protocol, or by information within the flow's packets 312 themselves, e.g., in a hop-by-hop option. Typically, IP Flows 310 are characterized according to the fields in the IP/L3 header that determines routing decisions such as: type of service, protocol, source address, destination address, source port, and destination port. Two packets belong to the same flow if the values of these fields are identical. In IP version 6, the inclusion of a Flow Label in the packet header allows the forwarding process to be enhanced by caching routing decisions. There may be multiple active flows 320 from a source to a destination, as well as traffic that is not associated with any flow (not shown). A flow is uniquely identified by the combination of a source address and a nonzero Flow Label. Packets that do not belong to any identified flow carry a Flow Label of zero. In the model, a single flow 310 is active as long as observed packets 312 that meet the flow specification are observed separated in time by less than a specified timeout value 330. As discussed above, multiple independent flows 320 may be active simultaneously. The flow end timers 330 for the different flows may expire at different times.

Figure 4:
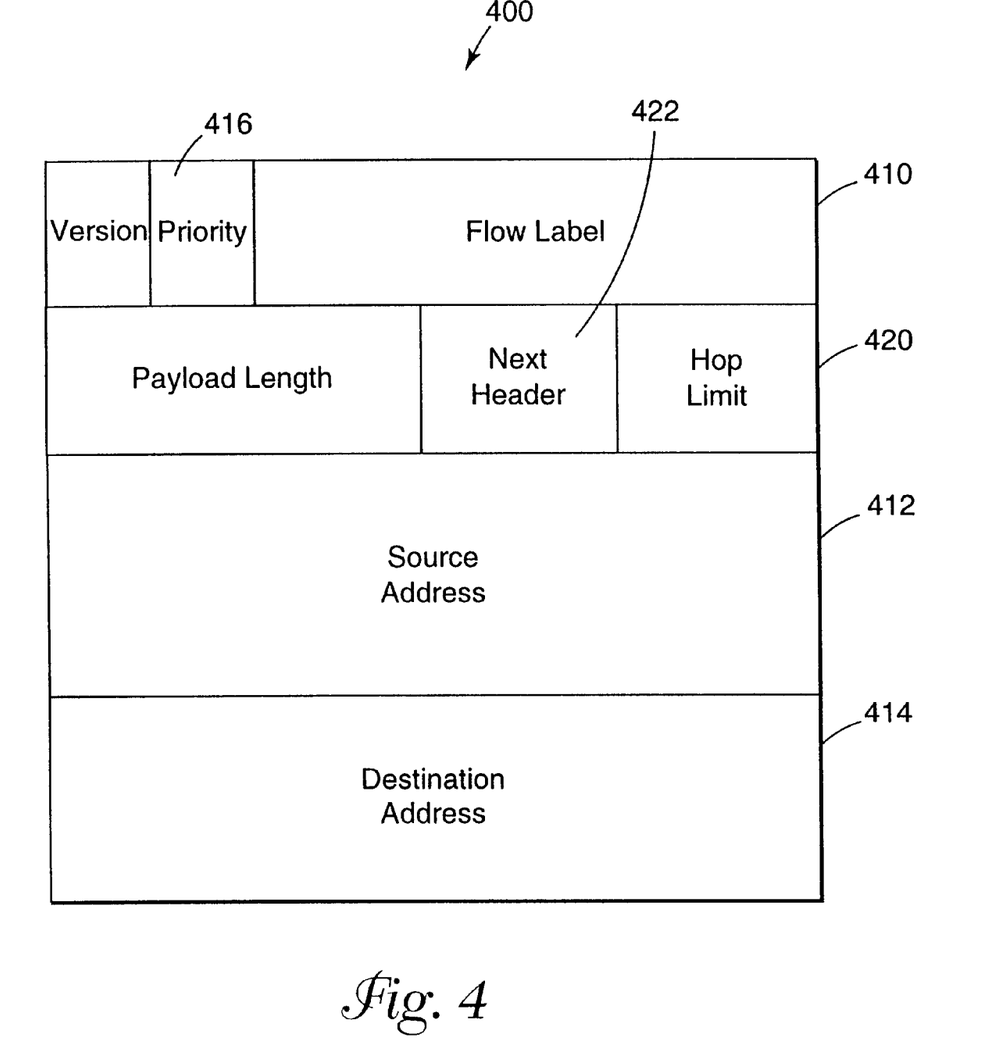
FIG. 4 illustrates the IPv6 header format.

FIG. 4 illustrates the IPv6 header format 400. For IPv6, the 24-bit Flow Label field 410 in the IPv6 header may be used by a source to label those packets for which it requests special handling by the IPv6 routers, such as non-default quality of service or "real-time" service. Hosts or routers that do not support the functions of the Flow Label field 410 are required to set the field to zero when originating a packet, pass the field on unchanged when forwarding a packet, and ignore the field when receiving a packet.

A Flow Label 410 is assigned to a flow by the flow's source node. New Flow Labels must be chosen (pseudo-) randomly and uniformly. The purpose of the random allocation is to make any set of bits within the Flow Label 410 suitable for use as a hash key by routers, for purposes of looking up the state associated with the flow.

All packets belonging to the same flow must be sent with the same source address 412, destination address 414, priority 416, and Flow Label 410. If any of those packets includes a hop-by-hop options header, then they all must be originated with the same hop-by-hop options header contents excluding the Next Header field 422 of the hop-by-hop options header 420. If any of those packets includes a Routing header, then they all must be originated with the same contents in all extension headers up to and including the Routing header (excluding the Next Header field in the Routing header). The routers or destinations are permitted, but not required, to verify that these conditions are satisfied. If a violation is detected, it should be reported to the source by an ICMP Parameter Problem message.

Routers are free to "opportunistically" set up flow-handling state for any flow, even when no explicit flow establishment information has been provided to them via a control protocol, a hop-by-hop option, or other means. For example, upon receiving a packet from a particular source with an unknown, non-zero Flow Label 410, a router may process its IPv6 header and any necessary extension headers as if the Flow Label 410 were zero. That processing would include determining the next-hop interface, and possibly other actions, such as updating a hop-by-hop option, advancing the pointer and addresses in a Routing header, or deciding on how to queue the packet based on its Priority field 416. The router may then choose to "remember" the results of those processing steps and cache that information, using the source address 412 plus the Flow Label 410 as the cache key. Subsequent packets with the same source address 412 and Flow Label 410 may then be handled by referring to the cached information rather than examining all those fields that, according to the requirements of the previous paragraph, can be assumed unchanged from the first packet seen in the flow.

A cached flow-handling state that is set up opportunistically, as discussed in the preceding paragraph, must be discarded within a predetermined time limit, e.g., 6 seconds, after it is established, regardless of whether or not packets of the same flow continue to arrive. If another packet with the same source address 412 and Flow Label 410 arrives after the cached state has been discarded, the packet undergoes full, normal processing (as if its Flow Label 410 were zero), which may result in the re-creation of cached flow state for that flow.

The lifetime of flow-handling state that is set up explicitly, for example by a control protocol or a hop-by-hop option, must be specified as part of the specification of the explicit set-up mechanism; it may exceed the predetermined time limit.

A source cannot re-use a Flow Label 410 for a new flow within the lifetime of any flow-handling state that might have been established for the prior use of that Flow Label 410. Since flow-handling state with the lifetime may be established opportunistically for any flow, the minimum interval between the last packet of one flow and the first packet of a new flow using the same Flow Label 410 is the same predetermined period of time. Flow Labels 410 used for explicitly set-up flows with longer flow-state lifetimes must remain unused for those longer lifetimes before being re-used for new flows.

Figure 5:
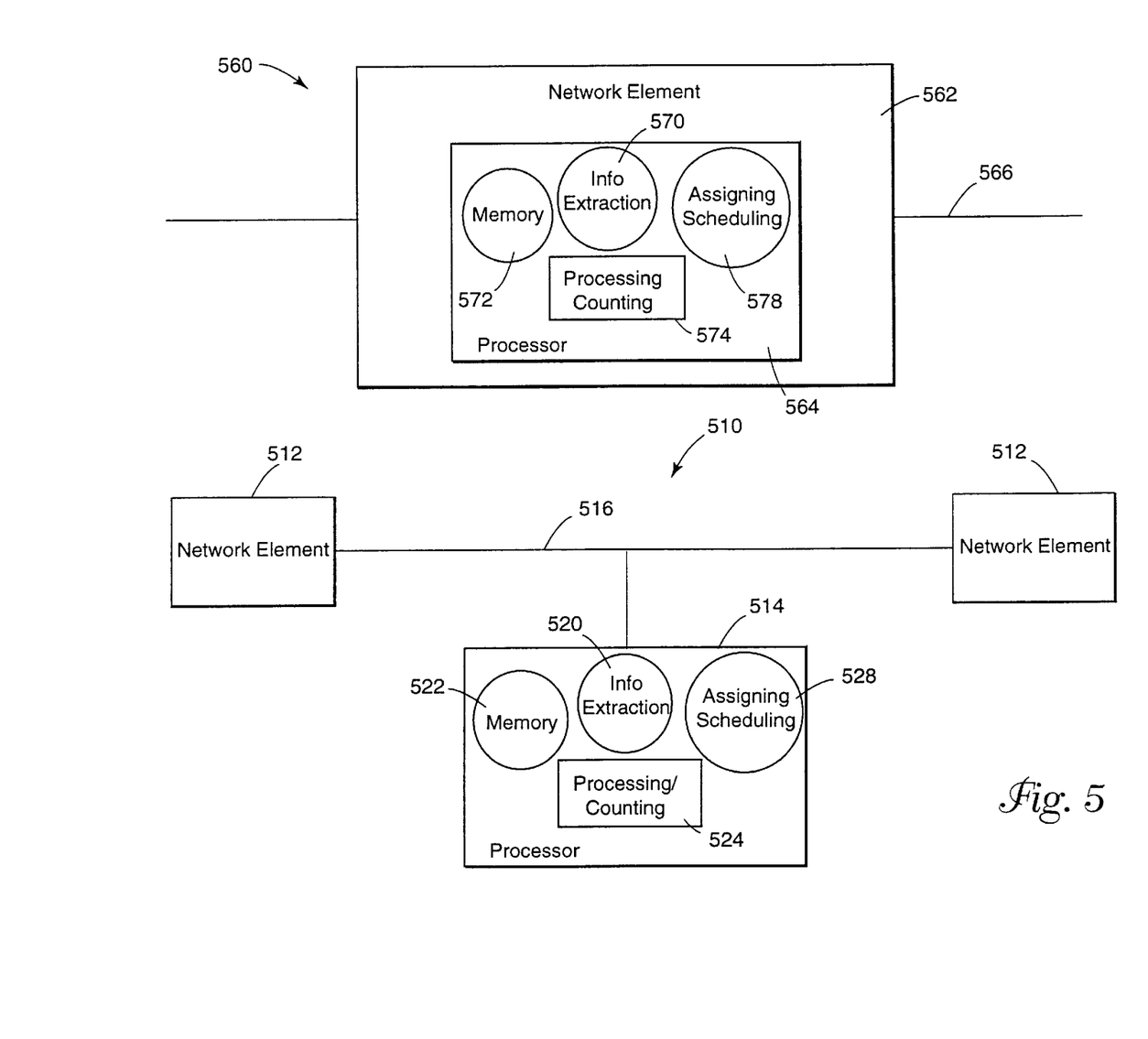
FIG. 5 illustrates two monitoring methods.

Internally to a network element, there are two basic ways to monitor data carried over an L2 connection: Point to Multipoint connection and ingress (or egress) of the network element. FIG. 5 illustrates these two monitoring methods. Packet snooping is a function that is typically done periodically. Snooping is done for a certain amount of time, which has to be long enough to take into account packet length variation and packet inter-arrival time. The monitoring period can either be specified in terms of time units, in terms of packet counts or, any combination of these two.

In Point to Multipoint connection snooping 510, L2 PDUs are replicated within the network element 512 and directed to specific entity 514 for IP level processing. This analysis can be done in special unit 514 that is not normally along the data path 516. In ingress/egress snooping 560, IP packet analysis is done in the ingress (or egress) of the network element 562. In this alternative, the analysis function is built into a network unit 562 that is normally along the data path 566.

The analysis of the packets is independent of the method that is used to implement the monitoring function. It can be assumed that either only IPv4 or IPv6 traffic is carried over any L2 connection, but not both. As the parts of the IP header structures that contain IP address information are in the fixed position from the beginning of the header, address information can be easily extracted from the packets by the processors 514, 564. This address information can then be analyzed by the processors 514, 564 to estimate the number of flows along the data paths 516, 566.

Figure 6:
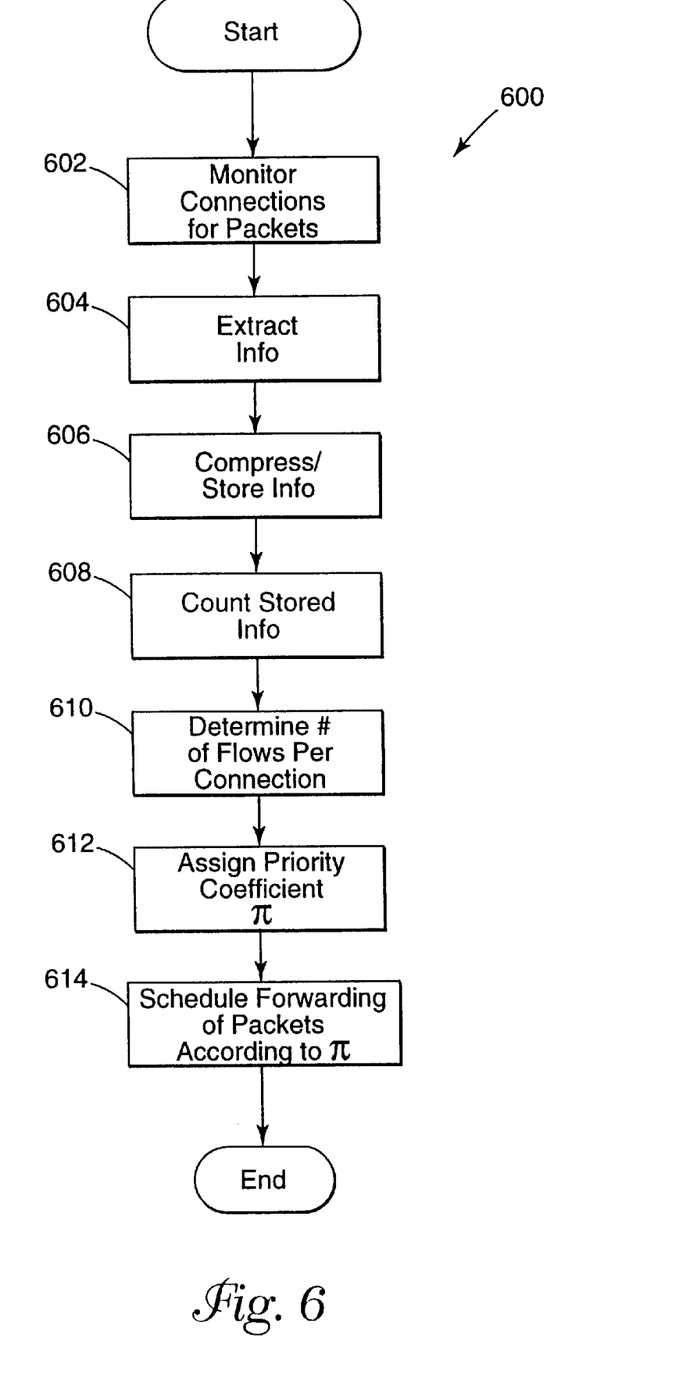
FIG. 6 is a flowchart illustrating the steps for approximating the number of flows and scheduling fair traffic allocation.

FIG. 6 illustrates a flowchart 600 depicting the steps for approximating the number of flows and scheduling fair traffic allocation. Only an approximation of the number of flows is needed to provide fairness, i.e., more equal access to network resources. Thus, the approximation analysis does not necessarily need to be very detailed. First, the connections are monitored for packets 602 and information is extracted from the packets 604. The extracted information may then be stored in memory 606. To conserve the memory, the data stored in memory may first be compressed. Next, after a predetermined period of time, the extracted information stored in memory is counted 608. Using this information, a determination of the number of flows per connection may be obtained 610. Timers may be used to control the duration of monitoring and the time between monitoring periods.

Several different methods may be used to approximate the number of flows. For example, the full source address:port and full destination address:port may be extracted from the header. Each unique full source address:port and full destination address:port pair can then be stored as a tuple in a database. At the end of the monitoring period, the number of stored tuples may be counted. Alternatively, since the same network addresses may be shared by different flows, only the host part of the IP address together with port can be extracted from the headers to simplify implementation. Each unique tuple may then be stored and then counted. Finally, any combination of the described methods may be used.

As stated above, the data can be compressed 606. This may be accomplished, for example, by a hashing function that is calculated over the extracted header part to conserve the memory required to store gathered data. Since only the approximate number of the flows is needed, using a hash function that occasionally gives identical values for dissimilar samples, i.e., using too short hash values, is not an issue. Therefore, a relatively short and simple implementation can be used. Yet, in the end of the snooping period, the number of tuples that have been recorded can be counted yielding an estimate of the number of different flows.

Rather than scheduling the IP flows according to traffic volume solely, a priority coefficient may be assigned to a flow to favor some sources over others, e.g. customers that subscribe to a higher service factor. These priority coefficients are only used internally in the network element and cannot be seen externally. Since multiple L2 connections having the same traffic class and aggregated IP flows may be competing for the same network resources, fairness, i.e., equal access to the network resource is desirable. Accordingly, an assignment of a priority coefficient for each of the IP flows 612 achieves better fairness. For example, a higher priority can be given to data units, e.g., cells or frames, belonging to a connection having more users. Furthermore, if there are two L2 connections that have an identical L2 specific traffic class, their mutual priority can also be defined. Finally, the priority coefficients may be assigned by an operator using network management.

According to one embodiment of the invention, for n connections $\{A_1 \ldots A_n\}$ competing over certain network resources at any given time, if there are $x_i$ flows that are carried over connection $A_i$, then the probability ($P_i$) that a data unit, i.e., frames or cells, belonging to flows $x_i$ carried over connection $A_i$ is forwarded instead of the flows of other connections is given by:

$$P_i = \sigma_i * x_i / \Sigma(x_1 \ldots x_n), i=\{1,2,\ldots,n\}$$

where $\sigma_i$ is a priority coefficient that can be given any positive, non-zero value. The overall relationship between parameters may be expressed as:

$$\Sigma_{(i=1-n)}(\sigma_i * x_i)/\Sigma_{(i=1-n)} x_i = 1.$$

The packets forwarded in the IP flows may be scheduled according to the priority coefficient 614.

The priority coefficient can be used to adjust this geometric fairness to changing conditions in the network, i.e., to favor certain connections over others.

In practice, for example, in case of ATM, this scheme would lead to the introduction of a new ATM traffic class variation, subclass that varies from one connection to another. In addition to standard UBR traffic, there may be designated "Fair UBR" which would be defined by the number of flows and a priority factor. The number of flows is a dynamic factor, whereas a priority coefficient can be more static in nature.

Priority factors may be given different values, e.g. based on the source and/or destination IP addresses or the link (logical or physical) where the traffic enters the network element. This enables differentiation of flows based on operational and administrative reasons to favor some flows or group of flows. For example, flows used to interconnect corporate sites and external partner companies can be prioritized based on extra compensation. Thus, an operator can prioritize all internal traffic.

Referring to FIG. 5 again, the data paths 516, 566 may be monitored by a processor 514, 564 to identify the number of IP flows for the connections 516, 566 by analyzing the packets carried over the connections 516, 566. The processor 514, 564 extracts address information 520, 570 from the packets for a predetermined sample period, stores the extracted address information in memory 522, 572 and, after the predetermined period of time, counts 524, 574 the number of extractions stored in the memory 522, 572. The processor 514, 564 then estimates the number of IP flows based upon the number of extractions counted. Finally, the processor 514, 564 assigns 528, 578 a priority coefficient for each of the IP flows and schedules 528, 578 the forwarding of packets in the IP flows according to the priority coefficient.

The foregoing description of the exemplary embodiment of the invention has been presented for the purpose of illustration and description. It is not intended to be exhaustive or to limit the invention to the precise form disclosed. Many modifications and variations are possible in light of the above teaching. It is intended that the scope of the invention not be limited with this detailed description, but rather by the claims appended hereto.

What is claimed is:

1. A method of prioritizing the scheduling of Internet Protocol (IP) flows, comprising the steps of:

identifying a number of IP flows for each of a plurality of connections;

assigning a priority to each of the plurality of connections based on the identified number of IP flows; and scheduling packet forwarding of the IP flows according to the assigned priority.

2. The method of claim 1 wherein the step of assigning a priority further comprises the step of defining a probability $P_i$ that a data unit belonging to a flow carried over a connection $A_i$ of n total connections, $A_i, \ldots A_n$, is selected for forwarding according to:

$$p_i = \frac{\sigma_i * x_i}{\sum (x_1 \ldots x_n)} \{i = 1, 2, \ldots n\}$$

where $x_i$ represents a number of flows carried over the connection $A_i$, $\sigma_i$ represents a priority assigned to flows $x_i$ and n represents a total number of connections.

3. The method of claim 2 wherein a relationship between the number of flows $x_i$ and the priority $\sigma_i$ is defined by:

$$\frac{\sum_{(i=l-n)} (\sigma_i * x_i)}{\sum_{(i=1-n)} x_i} = 1.$$

4. The method of claim 1 wherein the step of identifying the number of IP flows further comprises the steps of:
   monitoring packets carried over a connection;
   extracting address information from the packets for a predetermined sample period;
   storing the extracted address information;
   counting the number of extractions stored; and
   estimating the number of IP flows based upon the number of stored extractions counted.

5. The method of claim 4 wherein the step of extracting address information comprises the step of extracting full source address:port and destination address:port from the packets.

6. The method of claim 4 wherein the step of extracting address information comprises the step of extracting only a host or port part of an IP address from the packets.

7. The method of claim 4 wherein the step of storing the address information further comprises the step of compressing the extracted address information.

8. The method of claim 4 wherein the step of monitoring packets comprises the steps of:
   replicating PDUS; and
   directing the replicated PDUs to a processor for address extraction.

9. The method of claim 4 wherein the processor is outside the data path.

10. The method of claim 4 wherein the step of monitoring packets comprises the step of sampling the packets along the data path.

11. The method of claim 4 wherein the predetermined sample period comprises a selected time duration.

12. The method of claim 4 wherein the predetermined sample period comprises the time required to sample a predetermined number of packets.

13. The method of claim 1 wherein the step of assigning a priority further comprises the step of giving a higher priority to a connection having more users.

14. The method of claim 1 wherein the step of assigning a priority further comprises the step of differentiating a flow based on a management parameter.

15. The method of claim 14 wherein the management parameter represents operational and administrative considerations.

16. The method of claim 1 wherein the step of assigning a priority is based upon a compensation structure for different flow types.

17. An apparatus for scheduling Internet Protocol (IP) flows, comprising:

a monitor that identifies a number of IP flows for each of a plurality of connections;
a prioritizer, operatively coupled to the monitor, the prioritizer assigning a priority coefficient for each of the connections; and
a scheduler, operatively coupled to the monitor, the scheduler scheduling the IP flows according to the priority coefficient.

18. The apparatus of claim 17 wherein the priority coefficient assigned by the prioritizer results in a probability that a data unit belonging to a flow carried over connection $A_i$ is selected for forwarding as defined by:

$$\frac{\sigma_i * x_i}{\sum (x_1 \ldots x_n)} \{i = 1, 2, \ldots n\}$$

where $x_i$ represents a number of flows carried over connection $A_i$, $\sigma_i$ represents a priority coefficient and n represents a number of connections.

19. The apparatus of claim 18 wherein a relationship between the number of flows $x_i$ and the priority coefficient $\sigma_i$ is defined by:

$$\frac{\sum_{(i=l-n)} (\sigma_i * x_i)}{\sum_{(i=1-n)} x_i} = 1.$$

20. The apparatus of claim 17 wherein the monitor further comprises:
   means for analyzing packets carried over a connection;
   means for extracting address information from the packets for a predetermined sample period;
   a memory for storing the extracted address information;
   a counter for counting the number of extractions stored in the memory; and
   a processor for estimating the number of IP flows based upon the number of extractions counted.

21. The apparatus of claim 20 wherein the means for extracting address information further comprises means for extracting full source address:port and destination address:port from the packets.

22. The apparatus of claim 20 wherein the means for extracting address information further comprises means for extracting only a host part of an IP address and port from the packets.

23. The apparatus of claim 20 wherein the processor further comprises data compression means for compressing the extracted address information.

24. The apparatus of claim 17 wherein the monitor further comprises:
   means for replicating PDUs; and
   means for directing the replicated PDUs to a processor for address extraction.

25. The apparatus of claim 20 wherein the processor is outside the data path.

26. The apparatus of claim 20 wherein the processor samples the packets along the data path.

27. The apparatus of claim 20 wherein the predetermined sample period comprises a selected time duration.

28. The apparatus of claim 20 wherein the predetermined sample period comprises a time required to sample a predetermined number of packets.

29. The apparatus of claim 17 wherein the priority coefficient represents a higher priority for a connection having more users.

30. The apparatus of claim 17 wherein the priority coefficient is used to differentiate a flow based on a management parameter.

31. The apparatus of claim 30 wherein the management parameter comprises operational and administrative considerations.

32. The apparatus of claim 17 wherein the priority coefficient is based upon a compensation structure for different flow types.

* * * * *